United States Patent [19]
Salvatore, Jr. et al.

[11] Patent Number: 6,047,233
[45] Date of Patent: Apr. 4, 2000

[54] DISPLAY MANAGEMENT METHOD, SYSTEM AND ARTICLE OF MANUFACTURE FOR MANAGING ICONS, TAGS AND LEADER LINES

[75] Inventors: G. Peter Salvatore, Jr., Northport; Shiu Ming Tsang, Queens, both of N.Y.

[73] Assignee: Northrop Grumman Corporation, Los Angeles, Calif.

[21] Appl. No.: 08/846,084

[22] Filed: Apr. 25, 1997

[51] Int. Cl.$^7$ .............................. G01S 13/91; G01S 7/22; G08G 5/06
[52] U.S. Cl. ............................................ 701/120; 345/348
[58] Field of Search .............................. 701/120; 342/36; 340/990; 345/348

[56] References Cited

U.S. PATENT DOCUMENTS

| | | | |
|---|---|---|---|
| 4,673,929 | 6/1987 | Nelson et al. | 340/703 |
| 5,200,901 | 4/1993 | Gerstenfeld et al. | 364/439 |
| 5,218,674 | 6/1993 | Peaslee et al. | 395/166 |
| 5,334,982 | 8/1994 | Owen | 342/36 |
| 5,374,932 | 12/1994 | Wyschogrod et al. | 342/36 |
| 5,554,990 | 9/1996 | McKinney | 342/36 |
| 5,732,384 | 3/1998 | Ellert et al. | 701/120 |

FOREIGN PATENT DOCUMENTS 2232316  12/1990  United Kingdom .

OTHER PUBLICATIONS

L. Reynolds & Associates, "Colour For Air Traffic Control Displays", vol. 15, No. 4, Jan., 1994, pp. 215–225.
Michael Sena; Computer–Aided Dispatching; Computer Graphics World; May 1990.

*Primary Examiner*—Michael J. Zanelli

[57] ABSTRACT

A display managing system, method and article of manufacture displays icons, tags and leader lines based on tracking information that includes position information of a plurality of objects; determines if a tag or leader line conflicts with repositioned icons; and relocates the conflicting tag or leader line to prevent a tag or leader line from overlapping and thereby obscuring the icon. Furthermore, the tags and leader lines associated with the repositioned icons are, themselves, repositioned. If these repositioned tags and leader lines conflict with an existing icon, tag or leader line, then the conflicting tag and/or leader line are moved to unoccupied display grid coordinates or a tag location is time-shared between two conflicting tags. Leader line stretching may also be used to prevent tags from jumping around as the icon is moved. An organized data base, which may be in the form of x-y trees, is employed to encode the positions of the display elements to permit efficient searches to locate tags, leader lines and icons and to resolve conflicts therebetween. The invention may also be applied to manage the display of a fleet dispatcher or in a fleet dispatch system.

47 Claims, 13 Drawing Sheets

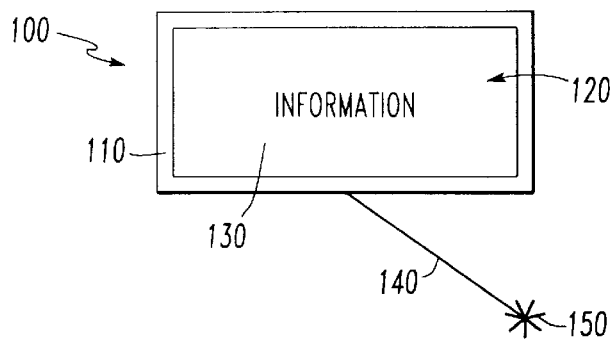

*FIG. 1*

| COLOR.TAG | | | | | |
|---|---|---|---|---|---|
| TRACK STATE | FOREGROUND | BACKGROUND | BORDER | LINE | ICON |
| DEPART | BLACK | CYAN | BLUE | BLUE | WHITE |
| DEPARTABORT | WHITE | RED | GREEN | GREEN | WHITE |
| LANDING | GREEN | BLUE | GREEN | GREEN | WHITE |
| TAXI | BLACK | GREEN | GREEN | GREEN | WHITE |
| ARRIVAL | BLACK | CYAN | GREEN | GREEN | WHITE |
| STOP | GREEN | BLACK | BLACK | GREEN | WHITE |
| CLIMBING | CYAN | BLUE | CYAN | CYAN | WHITE |
| DIVING | GREEN | BLUE | GREEN | GREEN | WHITE |
| CRUISING | CYAN | BLACK | BLACK | CYAN | WHITE |
| COASTING | WHITE | MAGENTA | LIGHTBLUE | LIGHTBLUE | WHITE |
| CAUTION | BLACK | YELLOW | YELLOW | YELLOW | WHITE |
| WARNING | WHITE | RED | RED | RED | WHITE |

*FIG. 5*

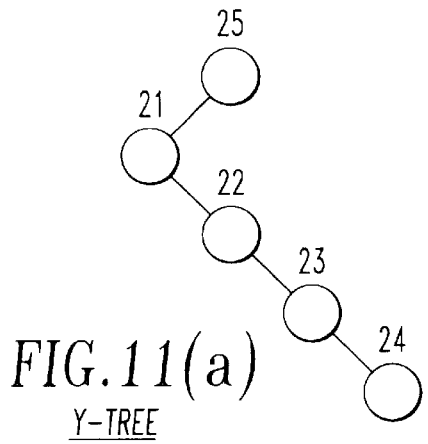
FIG.11(a)
Y-TREE
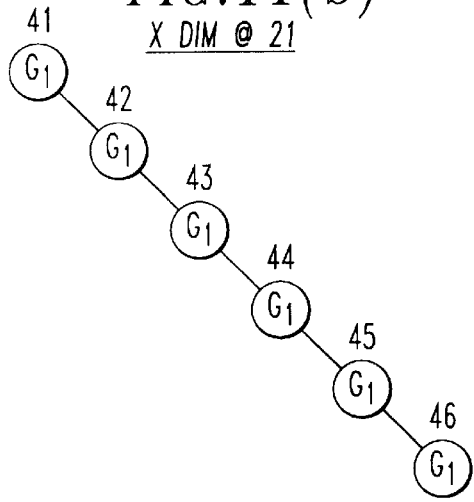
FIG.11(b)
X DIM @ 21
FIG.11(c)
X DIM @ 22
FIG.11(d)
X DIM @ 23
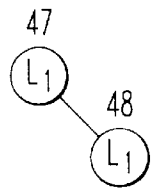
FIG.11(e)
X DIM @ 24
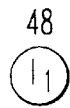
FIG.11(f)
X DIM @ 25

FIG.14(a)
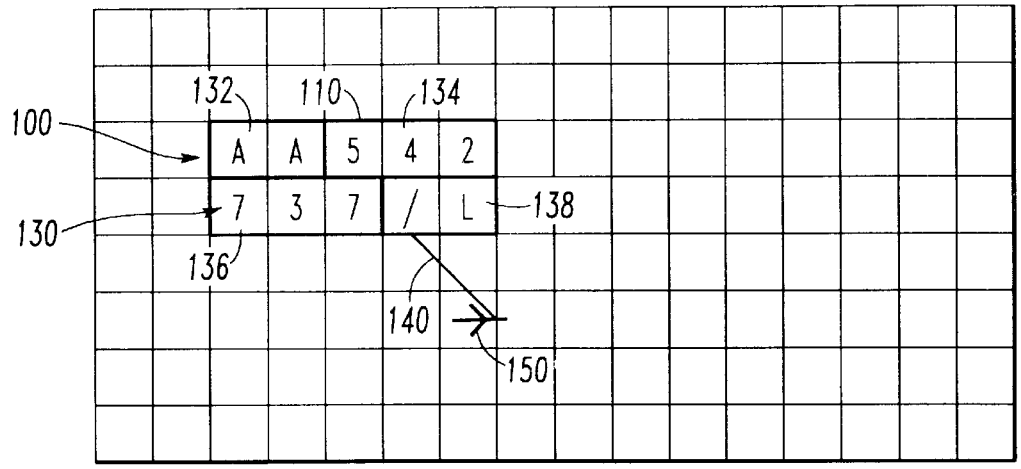
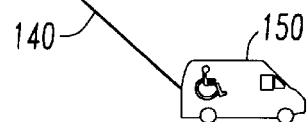
FIG.14(b)
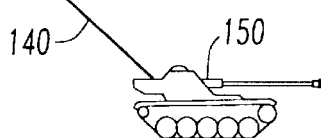
FIG.14(c)

DISPLAY MANAGEMENT METHOD, SYSTEM AND ARTICLE OF MANUFACTURE FOR MANAGING ICONS, TAGS AND LEADER LINES

CROSS-REFERENCE TO RELATED APPLICATION

This application is related to patent application, filed on Jun. 23, 1995, Ser. No. 08/494,119, now U.S. Pat. No. 5 5,557,278, Issued on Sep. 17, 1996, entitled "AIRPORT INTEGRATED AZARD RESPONSE APPARATUS," which is hereby incorporated by reference and which is assigned to the same assignee hereof.

COPYRIGHT NOTIFICATION

Portions of this patent application contain materials that are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Technical Field of the Invention

The invention generally relates to a tag managing method, system and article of manufacture which manages the display of tags, leader lines and icons. More particularly, the invention relates to an air traffic control display management method, system and article of manufacture which manages the display of icons representing objects such as aircraft and their associated tags and leader lines so as to present an organized display for the air traffic controller. The invention also relates to a fleet dispatch system which incorporates the inventive display management method.

2. Description of Related Art

Icons, tags and leader lines are generally known in the art wherein an icon is used to represent an object on a display, a tag displays information regarding the object and a leader line connects the icon and tag.

Conventional tag displaying systems, such as the Automated Radar Terminal System (ARTS) merely display the tag at a fixed position with respect to the aircraft icon. In other words, conventional tag displaying systems maintain the tags at a fixed position in relation to their respective icons. Tags are allowed to be placed an top of runways, taxiways, other leader lines and other tags. In other words, there is no logic or intelligent management behind conventional tag displaying systems.

The result in conventional systems is that air traffic controllers are presented with a confusing picture which obscures important information. For example, by allowing tags to overlap, the air traffic controller is unable to accurately keep track of each aircraft because some of the tags are overwritten by other tags. Furthermore, by allowing tags to be placed on runways, conventional tag displaying systems lead to potentially hazardous situations. For example, a tag placed on a runway may obscure an aircraft performing a landing. Thus, the air traffic controller will not see this landing aircraft and may clear another aircraft to take off on that same runway. Because the air traffic controller was unaware of the landing aircraft due to the illogical placement of a tag, a collision may occur.

Furthermore, the fixed positional relationship of the tag and icon presents a somewhat jumpy display. In other words, when an icon moves on the display, the tag is always moved along with it. The result is that both the tag and icon appear to jump to another location. This jumpy display increases the difficultly of the air traffic controller's task because it makes it more difficult to keep track of is the locations of the aircraft and their tags.

SUMMARY OF THE INVENTION

It is an object of the invention to provide a generalized display managing method and system which solves the problems associated with conventional tag displaying methods by generating an organized and logical display of icons, tags and leader lines.

It is an object of the invention to manage the display of aircraft icons, tags and leader lines to present a logical and organized display to an air traffic controller.

It is yet another object of the invention to prevent tags from overlapping an icon and to prevent tags from overlapping each other to prevent obscuring information displayed within the tags.

It is still another object of the invention to prevent a jumpy display of tags by maintaining a tag in a fixed position while moving the icon and stretching the leader line until the leader line reaches a predetermined length and then moving the tag closer to the associated icon.

It is yet another object of the invention to utilize the display managing method of the invention in a fleet dispatch system wherein the fleet may be generalized units, vehicles or military units.

It is still another object of the invention to provide an article of manufacture including a computer-usable medium having computer-readable program code embodied therein for causing a computer to manage icons, tags and leader lines on a display.

The display managing system and method of the invention displays icons, tags and leader lines based on tracking information that includes position information of a plurality of objects; updates the position information; repositions the icon on the display at an updated display position; determines if a tag or leader line conflicts with the repositioned icon; and relocates the conflicting tag or leader line to prevent a tag or leader line from overlapping and thereby obscuring the icon.

Then, the tags and leader lines associated with the repositioned tags are, themselves, repositioned. If these repositioned tags and leader lines conflict with an existing icon, tag or leader line, then the conflicting tag and/or leader line are moved to unoccupied display grid coordinates. It this is not possible, then a tag location is time-shared between two conflicting tags. Furthermore, the moving of such conflicting tags and/or leader lines may be prioritized. Also, a tag position may be maintained and the leader line stretched until it is a predetermined length before moving the tag closer to the associated, repositioned icon.

The invention also utilizes an organized data base, preferably in the form of x-y trees, which may be efficiently searched to locate tags, leader lines and icons and to resolve conflicts therebetween.

Still further, the invention may be embodied as an article of manufacture such as a computer disk having the inventive method and coded thereon, which causes a computer to manage icons, tags and leader lines on a display.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The file of this patent contains at least one drawing executed in color. Copies of this patent with color drawing(s) will be provided by the Patent and Trademark Office upon request and payment of the necessary fee.

The present invention will become more fully understood from the detailed description given hereinbelow and the accompanying drawings which are given by way of illustration only, and thus are not limitative of the present invention, and wherein:

FIG. 1 shows a tag, leader line and icon which are displayed by the invention;

FIG. 5 is a chart of colors for the tag foreground, tag background, tag border, leader line and icon for various track states;

FIGS. 11(a)–(f) show X- and Y-trees to illustrate the organized database according to the invention which encodes the display shown in FIG. 2;

FIGS. 14(a)–(c) show various forms of tags which may be displayed by the invention.

DETAILED DESCRIPTION OF THE PREFERRED EMBODIMENTS

Figure 2:
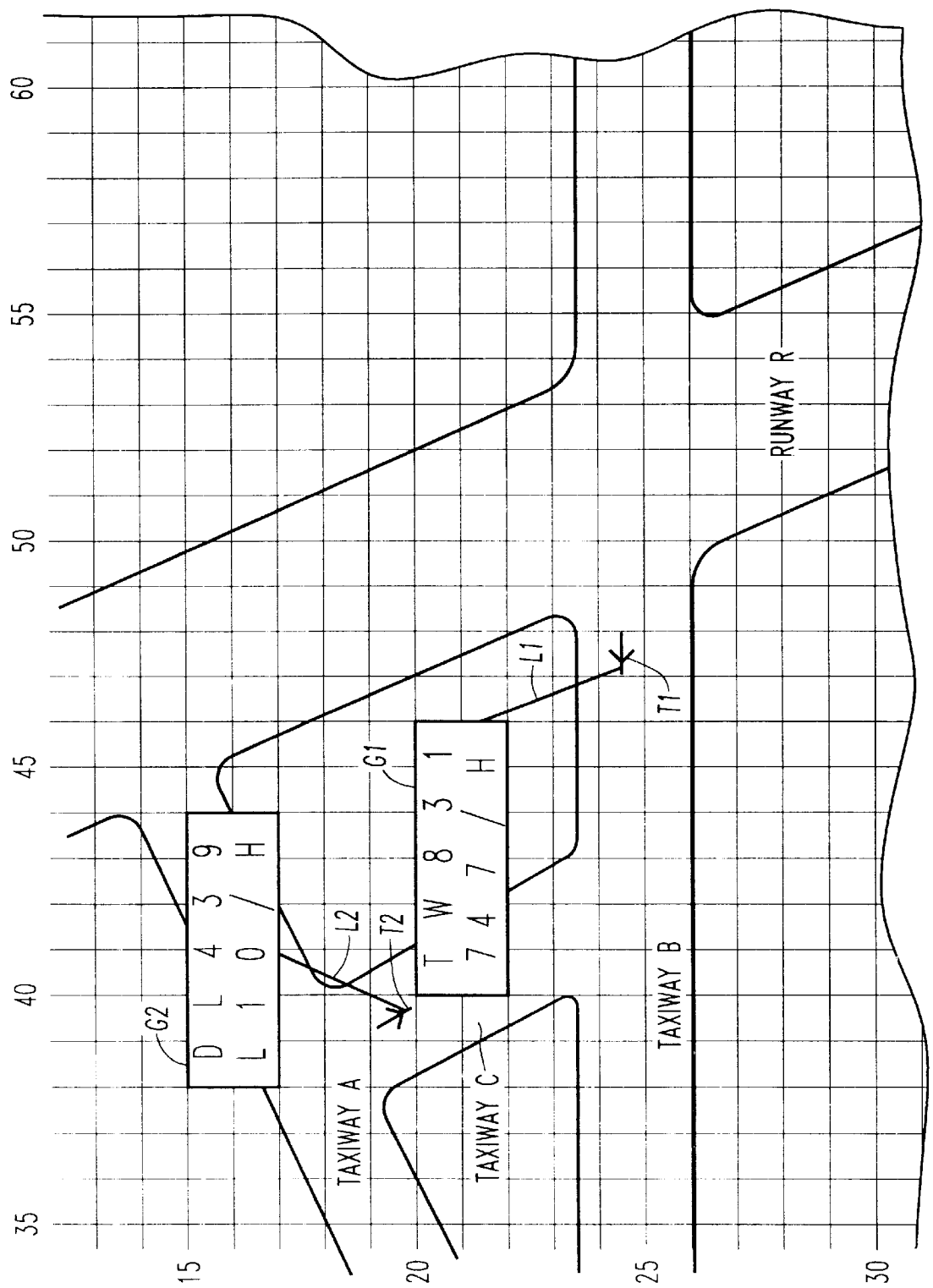
FIG. 2 is an example of a display according to the invention including two tags, two icons and two leader lines and also including a runway and various taxiways which are used to illustrate features of the invention.

As shown in FIG. 1, a tag 100 includes three main components: a border 110 surrounds a background 120 onto which information 130 may be displayed. Each tag 100 is associated with a corresponding icon 150. A leader line 140 connects the tag 100 and the icon 150.

As will be described in more detail below, the border 110, background 120, information 130, leader line 140 and icon 150 are preferably assigned a color so as to provide a color display. Furthermore, the information 130 generally conveys useful information to the operator concerning the associated icon 150. Particular examples of tags 100 are shown in FIGS. 14(a)–(c) and described below.

FIG. 2 illustrates an exemplary display of the invention which is used for illustrated various features of the invention as described in more detail below. FIG. 2 shows the portion of the display including display grid coordinates (35-77, 13-45). The display shown in FIG. 2 includes runway R and taxiways A, B and C.

In the air traffic control industry, the positions of aircraft are tracked. Therefore, an icon representing an aircraft is often referred to as a "track". Using this nomenclature, FIG. 2 shows the position of a first aircraft at track T1 and the position of a second aircraft at track T2. Furthermore, a tag G1 is associated with track T1 and a leader line L1 connects track T1 and tag G1. Similarly, a tag G2 is associated with track T2 and leader line L2 connects T2 and G2. The encoding of the tracks, leader lines 140 and tags 100 into an organized database will be more particularly described in reference to FIGS. 10 and 11 below.

Tags G1 and G2 are examples of generalized tag 100. As shown in FIG. 2, tag G1 provides important information to the air traffic controller. The format of such tags 100 will be more particularly described in relation to FIG. 14(a) below. For now, it is sufficient to state the tag G1 conveys to the operator that track T1 is TWA Flight 831 which is a Boeing 747 heavy aircraft.

Figure 3:
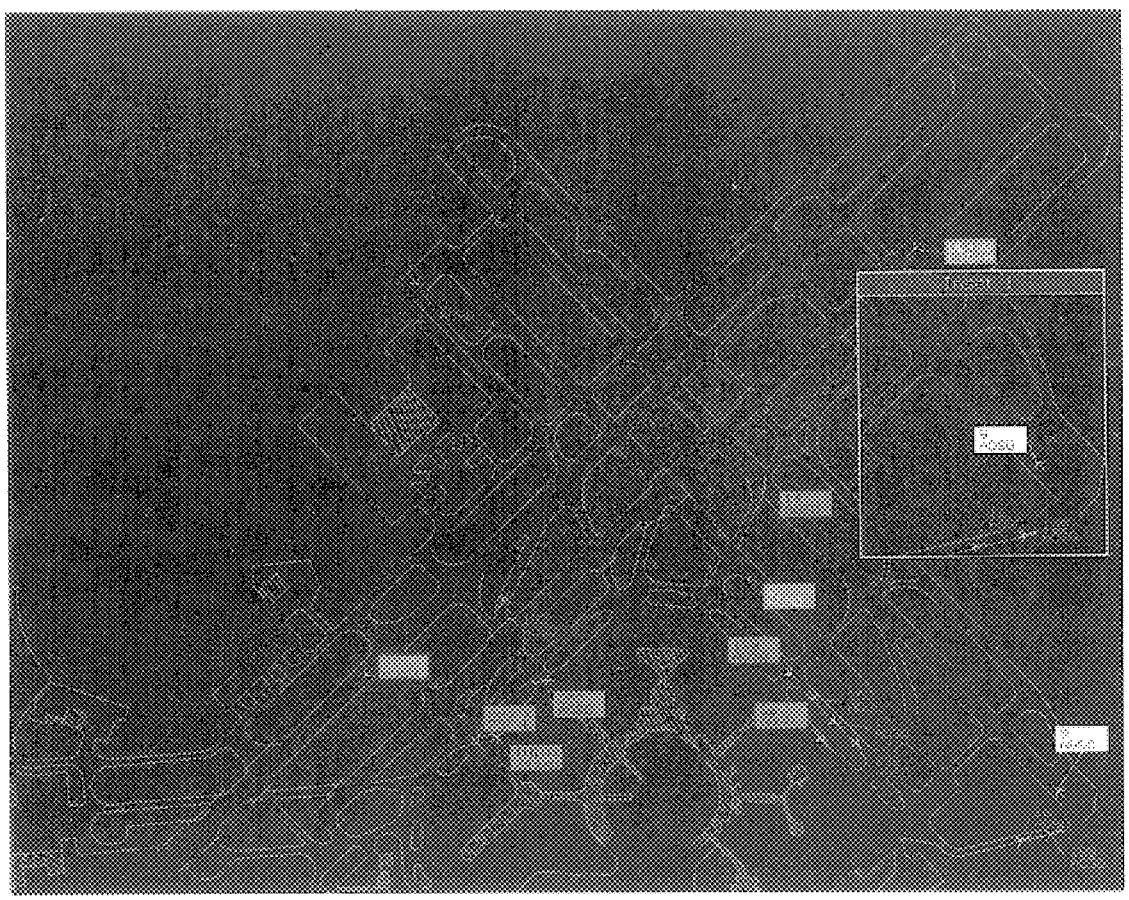
FIG. 3 is a color screen printout from an example of the invention showing multi-color tags, leader lines and icons.

FIG. 3 is an actual full-color display from a working embodiment of the invention. The airport shown in FIG. 3 is the San Francisco International Airport and the data utilized to construct FIG. 3 were taken from actual tracking data from this airport. FIG. 3 clearly shows some of the advantages of the invention including the organized display of icons 150, leader lines 140 and tags 100; the use of color tags, icons and leader lines; and the overlay of airport surface features such as runways and taxiways.

Also shown in FIG. 3 is an inset screen, inset 1, which magnifies a particular area of interest for the is air traffic controller. Such inset screens, in and of themselves, are generally known in the art as is the method and apparatus for generating such inset screens, adjusting the area of interest and degree of magnification.

Figure 4:
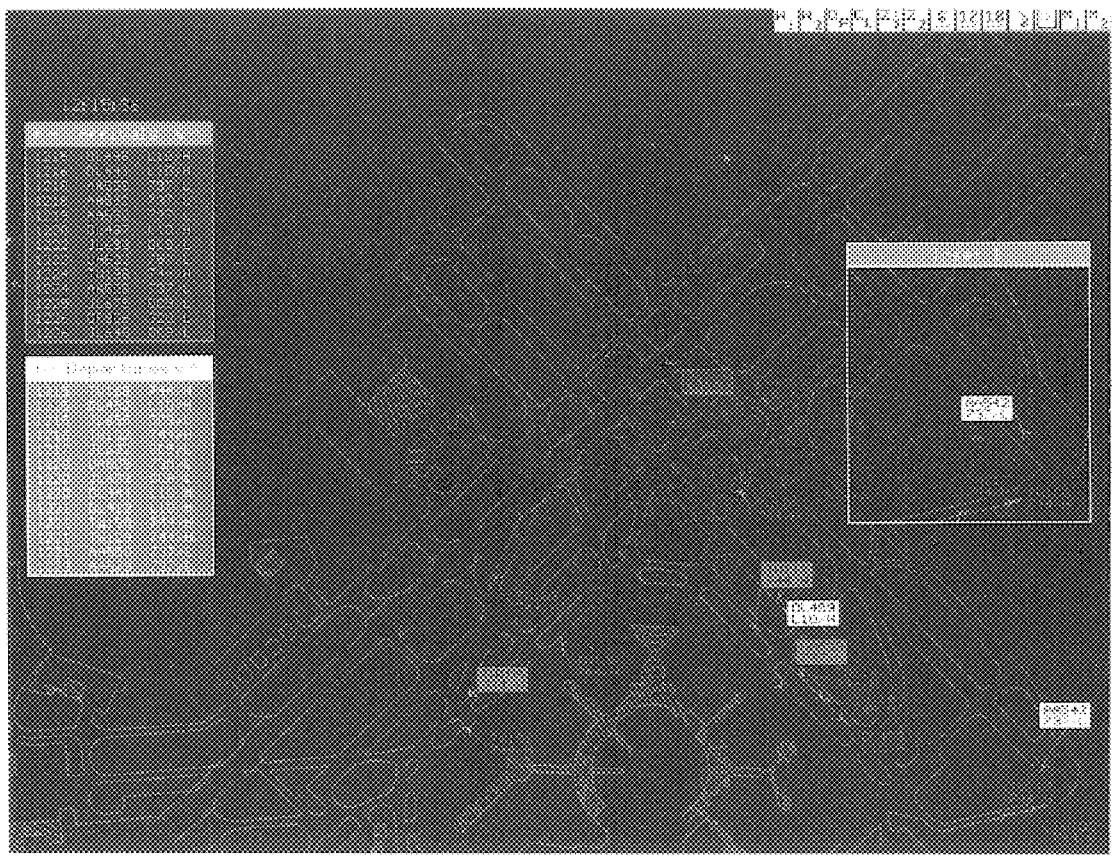
FIG. 4 is another color screen printout from an example of the invention showing multi-color tags, leader lines and icons and also including an inset showing arrivals and departures.

FIG. 4 is another color output from the working embodiment of the invention. FIG. 4 shows various color combinations for the tag 100, leader lines 140 and icons 150 not illustrated by FIG. 3. FIG. 4 also illustrates that other inset screens such as an Arrival inset screen and Departure inset screen may be overlaid onto the inventive display to further enhance the information provided to the air traffic controller.

Also included in FIG. 4 is a time clock display and a tool bar located at the top of the screen to enable the air traffic controller to manipulate the system and display.

FIG. 5 is a chart of color combinations which may be assigned to the tags 100, leader lines 140 and icons 150. As can be seen from the FIG. 5 chart, each aircraft track state has a unique color combination assigned thereto. This unique color combination conveys important information in a rapid and efficient manner to the air traffic controller. The color combinations shown in FIG. 5 are the preferred embodiment when the invention is applied to the air traffic control environment.

It is to be understood that the combination of colors for the tag foreground (information 130), tag background 120, tag border 110, leader line 140 and icon 150 may be altered or used to convey information other than track state as will be more particularly described in the alternative applications of the invention below.

Returning to FIGS. 3 and 4, yellow hold bars are shown in these drawings. These yellow hold bars are typically placed along an active runway and block the taxiways which cross the active runway. Hold bars may be used to indicate the advisability of entering an active runway to the air traffic controller. For details concerning the generation and management of such hold bars, this application relies upon U.S. patent application (Attorney Docket No. N-1253) filed on Jun. 23, 1995, Ser. No. 08/494,119, now U.S. Pat. No. 5,557,278, Issued on Sep. 17, 1996 which is incorporated by reference above.

Air Traffic Control Display Management System

Figure 6:
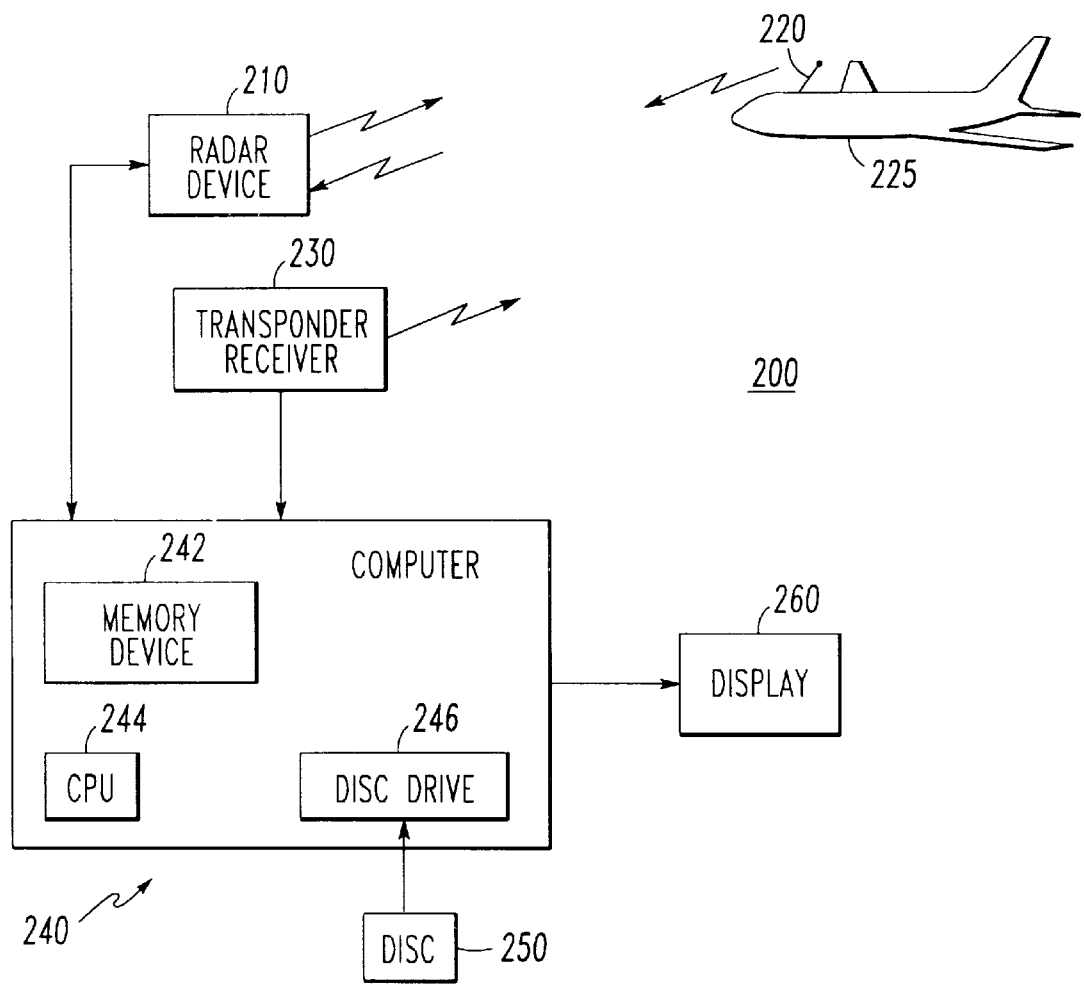
FIG. 6 is an air traffic control display management system according to the invention.

FIG. 6 illustrates an air traffic control display management system 200 according to the invention. As shown in FIG. 6, the air traffic control display management system 200 include a radar device 210 transmitting radar radiation and receiving echoes from objects within the range of the radar device 210.

Depending upon the particular application, the radar device 210 may be constructed with an airport surface detection equipment (ASDE) system that provides high-resolution, short-range, clutter-free, surveillance information on aircraft and ground vehicles, both moving and fixed, located on or near the surface of airport movement and holding areas under all weather and visibility conditions. An ASDE system formats incoming surface detection radar information for a desired coverage area, and presents it to the computer 240 for display on display 260.

The radar device 210 may also include airborne surveillance radar equipment for medium and long-range surveillance of airborne tracks and/or secondary surveillance radar. Also, the radar device 210 may be replaced with a position determining device, such as a global positioning system (GPS) or Long Range Navigation (LORAN) system to determine the position of the objects tracked by the system 200.

The system 200 also includes a transponder receiver 230 that receives a transponder signal from a transponder 220 typically located on each aircraft 225. Such known transponders 220 typically transmit data such as aircraft identification information and altitude information. Both the radar device 210 and transponder receiver 230 are connected to a computer 240.

Computer 240 includes a memory device 242, central processing unit (CPU) 244, and mass storage device such as disk drive 246. The disk drive 246 accepts a computer-readable medium such as disk 250. As will be explained below, disk 250 may embody the invention by storing computer-readable code thereon which may be loaded into the computer 240 by inserting the disk 250 into the disk drive 246.

It is to be understood that computer 240 is not limited to the single computer 240 shown in FIG. 6. For example, a distributed computer system located at separate physical locations, a parallel processing computer or other known computing device may be used as computer 240. Display 260 may include a single display for an air traffic controller or multiple displays for a team of air traffic controllers to output the display information generated by the invention.

Display Manageing Overview

As mentioned above, the present invention intelligently manages icons 150, leader lines 140 and tags 100 to present an organized and informative display to the air traffic controller. Below, a general description of these operations will be presented and then more detailed descriptions of exemplary implementations will be described.

Referring now to FIG. 6, the air traffic control display management system 200 utilizes radar device 210 to locate all of the objects within its radar range. Furthermore, a transponder 220 located on each aircraft 225 sends a transponder signal which is received by transponder receiver 230. This transponder signal typically identifies the aircraft 225 and may also include altitude information. The computer 240 receives the positional information from the radar device and the transponder signal from the transponder receiver 230 and then combines this data into a track report. The track report thereby includes the positional and identification information necessary to track each of the aircraft 225 within the monitored air space. These track reports may be stored within the memory device of computer 240.

When the computer 240 is programmed by, for example, inserting disk 250 into disk drive 246, a special purpose computer results which is configured to manage the air traffic control system 200. In this way, central processing unit (CPU 244) may then operate upon the track reports in memory device 242 and thereby generate display information for display 260.

The memory device 242 may also include a digital map of the airport surface when the system 200 is utilized to track aircraft on or near the airport surface and manage the icons 150, tags 100 and leader lines 140 therefor. Memory device 242 may also be loaded with a map of the air space to be monitored by the system 200. In this way, the airport surface map or air space map may be overlaid onto the icons 150, tags 100 and leader lines 140 generated and managed by the system 200 to provide a frame of reference for the air traffic controller.

It is to be understood that radar device 210 and transponder receiver 230 receive signals on a continuous, or at least discreet, basis to update the tracking information. In other words, the system 200 monitors a dynamic situation that changes rapidly and which requires relatively frequent updates of the tracking information to provide accurate information to the air traffic controller.

Whenever a track report is updated, the system 200 must then decide whether to reposition or relocate the corresponding icons 150, tags 100 and leader lines 140. More particularly, the system 200 tests whether the display grid coordinate for each icon 150 has changed in the updated track report. If the icon position has changed, then the icon 150 must be repositioned on the display.

Because an air traffic controller is most concerned with the location of each aircraft, and because this location is represented by the icon 150, the icon 150 is given the highest priority on the display 260. This high priority assigned to the icon 150 means that no other information is permitted to obscure the icon 150. Thus, the icons 150 are typically repositioned first by the system 200 and then any conflict with other tags 100 or leader lines 140 will then be resolved.

Exemplary Embodiment of Display Managing Method

FIGS. 7–10 more particularly describe, in a high-level flow chart format, an exemplary embodiment of the method of managing icons 150, leader lines 140 and tags 100.

Figure 7:
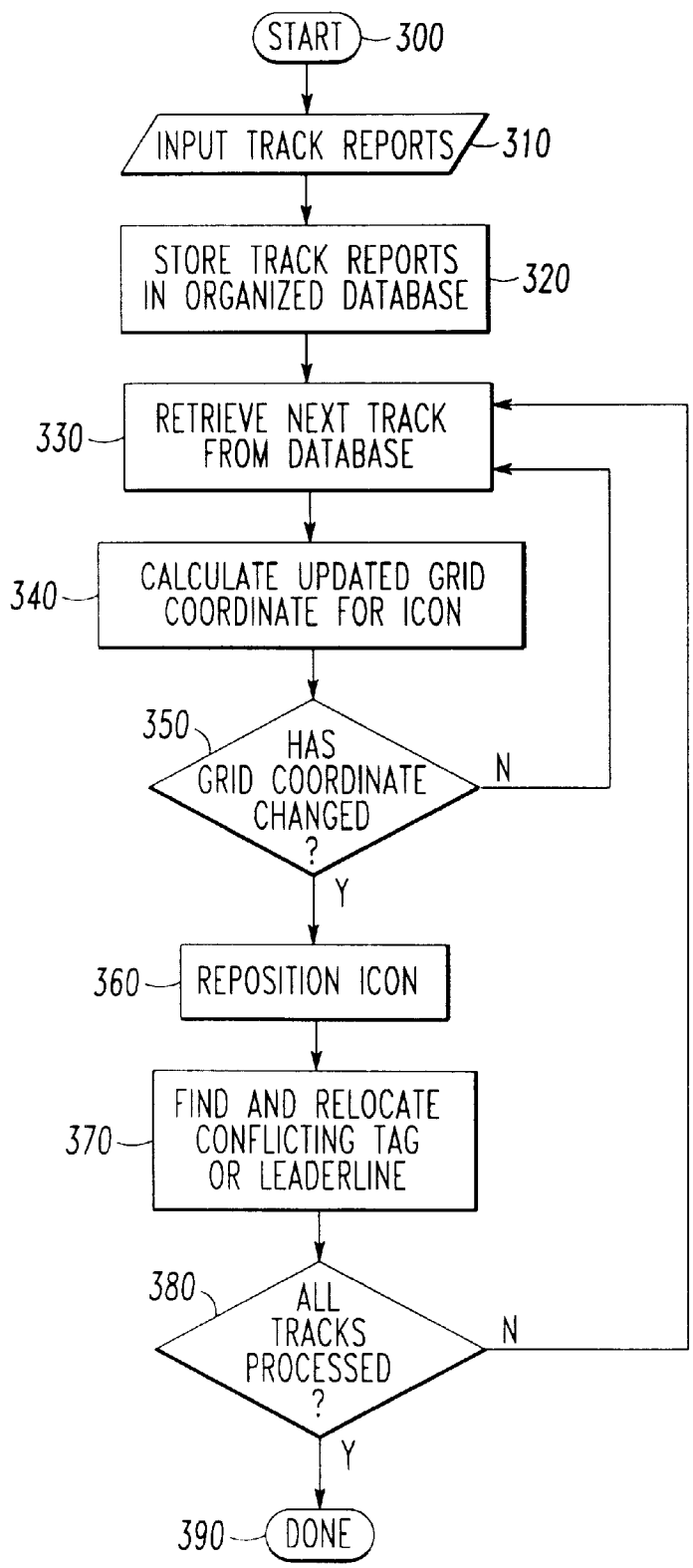
FIG. 7 is a high-level flow chart explaining an exemplary method for displaying tags, leader lines and icons.

As shown in FIG. 7, the display managing process begins at start step 300 and then proceeds to step 310, which inputs the track reports described above. These track reports are then stored in step 320, preferably in an organized database.

As mentioned above, memory device 242 may be utilized to store these track reports. The method of organizing the database will be more particularly described in relation to FIGS. 11(a)–(f) and 12 below.

Then, as further shown in FIG. 7, the process utilizes a repetitive loop to step through each of the track reports as follows. This loop begins with step 330, which retrieves a next track report from the database. Then, step 340 calculates the updated grid coordinate for the icon 150 in that retrieved track report.

Because the positional information is typically of greater resolution than the resolution of display 260, there is not a one-for-one correspondence between the position of the aircraft 225 and the display grid coordinate. Step 340 calculates the mapped position of the icon 150 has changed with respect to the last update of the track report.

Then, step 350 determines whether the display grid coordinate for the icon 150 has changed with respect to the last-received track report for that icon 150. If the grid coordinate for the icon 150 has not changed or if the track (icon) is not currently displayed, then the process proceeds to the next track by returning to step 330 and proceeding with the next track report from the database. The second part of this test weeds out tracks that are within the last-received track report but are not within the limited viewing area presented by the display.

On the other hand, if decision block 350 determines that the icon grid coordinate position has changed with respect to the last updated track report for that icon 150, then the process proceeds to step 360. Step 360 repositions the icon 150 on the display 260 according to the grid coordinate calculated in step 340.

As mentioned above, the repositioned icon 150 has priority over all other display features. Thus, the repositioned icon 150 will dislocate any existing, conflicting tags 100 or leader lines 140.

Step 370 is then performed which finds any such conflicting tags or leader lines which occupy display grid coordinates that conflict with the repositioned icon from step 360. Step 370 also relocates any such conflicting tags or leader lines as will be described in more particular detail in relation to FIG. 8.

Then, step 380 is performed to determine whether all tracks have been processed: if not, then the method loops back to step 330 and, if so, then the method is done as indicated by step 390.

Figure 8:
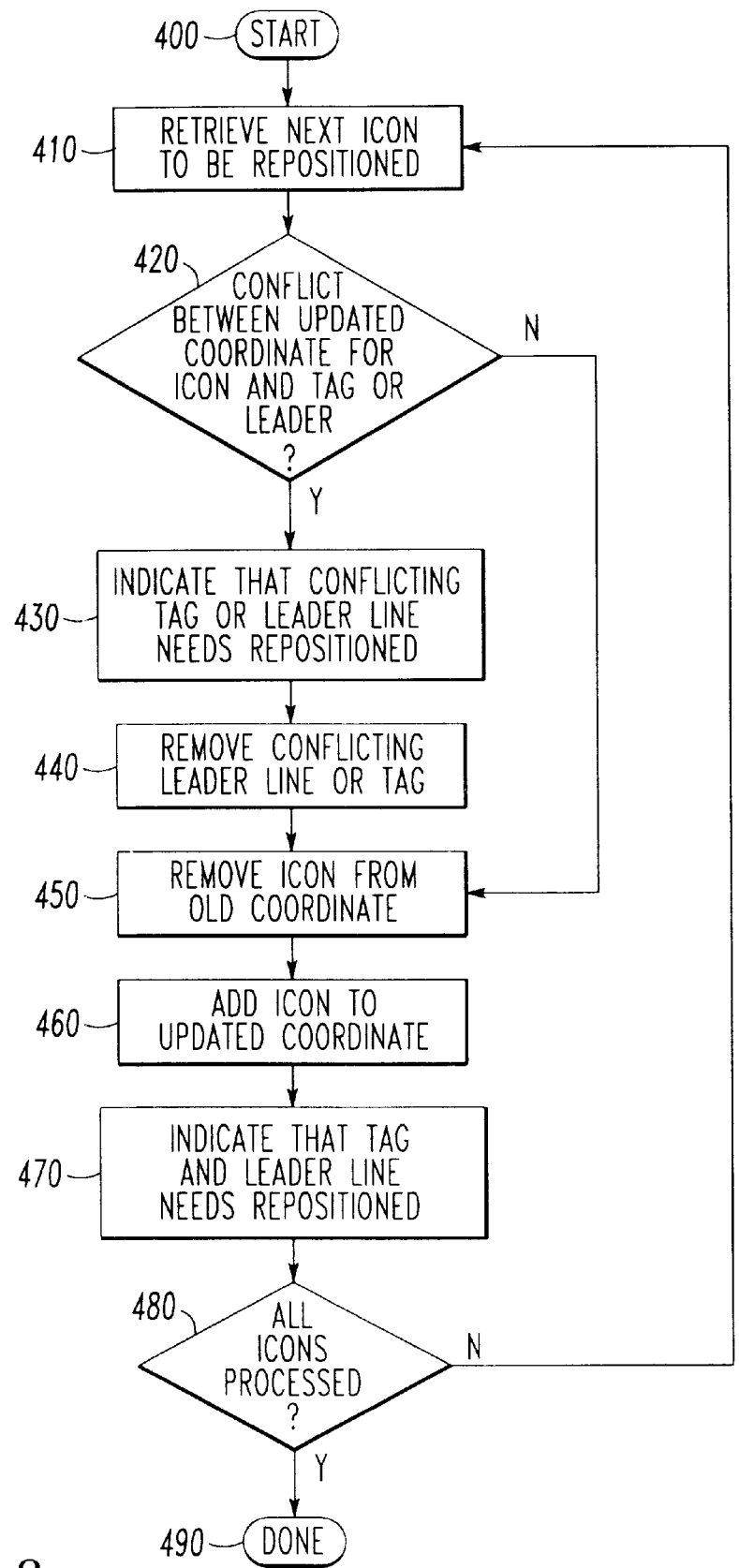
FIG. 8 is a high-level flow chart which explains an exemplary process for resolving conflicts between icons, tags and leader lines.

FIG. 8 is a high-level flow chart which describes in more detail the operations performed by repositioning icon step 360 and finding/relocating conflicting tags and/or leader lines step 370.

The process shown in FIG. 8 begins with start step 400. This process then enters a repetitive loop that steps through each of the icons that need to be repositioned. The icons to be repositioned are determined by steps 330, 340 and 350 in FIG. 7.

After step 410 retrieves the next icon to be repositioned, the process proceeds to decision block 420. Decision block 420 determines whether a conflict exists between the updated coordinate for the icon and any tags or leader lines. It no conflict exists between the repositioned icon 150 and a tag 100 or leader line 140 in block 420, then the process proceeds to step 450.

Step 450 removes or erases the icon from the old display grid coordinate. Then, the process proceeds to step 460 which adds or displays the icon at the updated display grid coordinate which was calculated in step 340 as described above.

Returning to decision block 420, if a conflict does exist between the repositioned icon 150 and a tag 100 or leader line 140, then the method proceeds to step 430.

Step 430 indicates that a conflicting tag 100 or leader line 140 needs repositioned. In other words, some indication such as a flag or stack is utilized by the method to indicate each conflicting tag or conflicting leader line that conflicts with the repositioned icon and which requires future repositioning or relocating.

Then, the conflicting leader line or tag is then removed or erased from the display in step 440. Because of step 430, the method will not forget that these conflicting tags or leader lines need repositioned.

The method then proceeds to step 450 which removes or erases the icon from the old display grid coordinate. In this way, the icon may be added to the updated display grid coordinate in step 460.

After step 460, the method proceeds to step 470, which indicates that the tag and the leader line associated with the icon retrieved in step 410 and moved in steps 450 and 460 also need to be repositioned. In other words, each time that an icon is repositioned, the corresponding tag and leader line associated with that icon also need to be redrawn or repositioned. The repositioning of tags 100 and leader lines 140 will be more particularly described in relation to FIG. 9 below.

The method then determines whether all icons have been processed in step 480. If not, then the method loops back to step 410 which retrieves the next icon to be repositioned. If, on the other hand, all the icons have been processed (all icons which need to be repositioned as determined by steps 340, 350 and 360) then the method is done as indicated by step 490.

Figure 9:
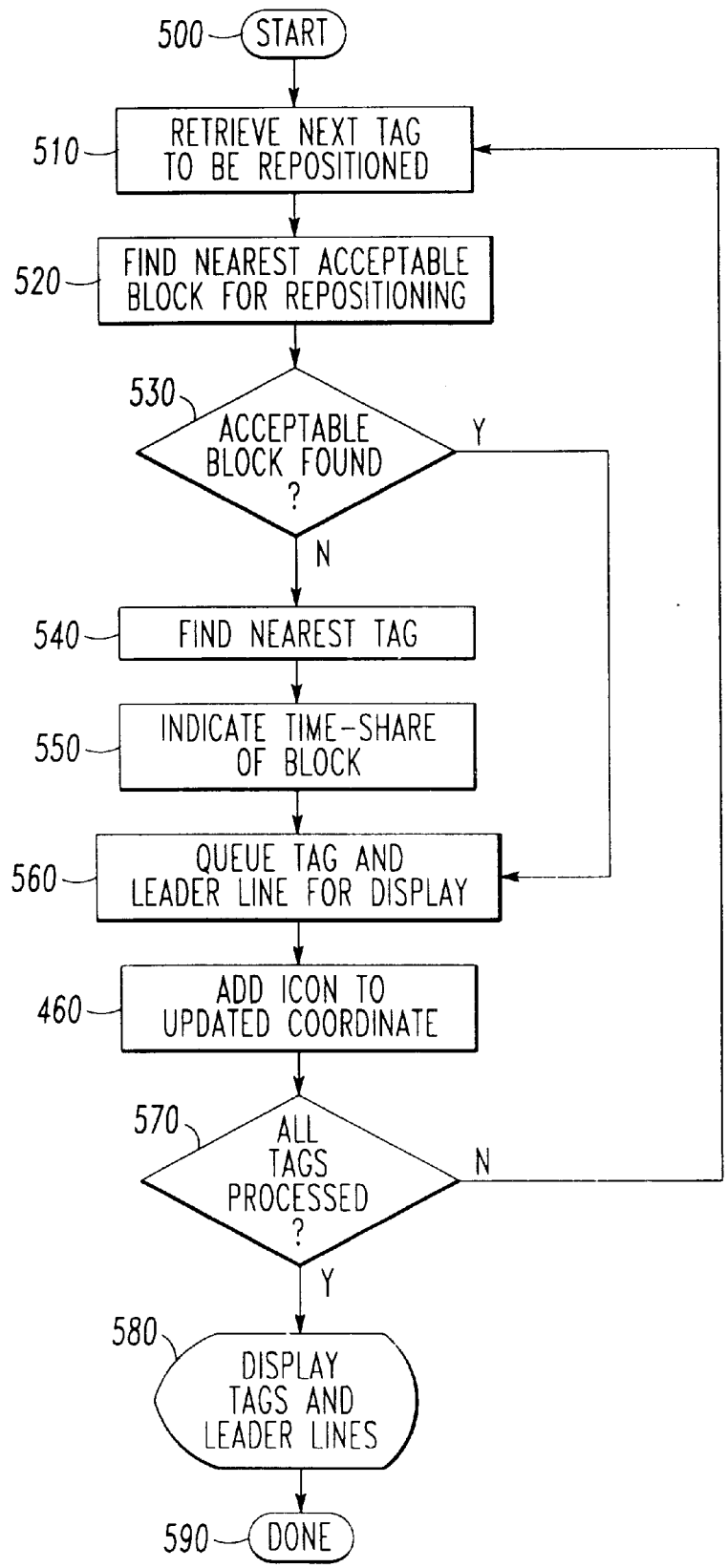
FIG. 9 is a high-level flow chart for repositioning tags and determining whether a time-share tag is appropriate.

FIG. 9 more particularly describes the repositioning of tags 100 and leader lines 140. Although FIG. 9 only explicitly refers to tags, it is to be understood that leader lines 140 are also repositioned along with the repositioned tag. FIG. 9 is basically a loop which steps through each of the tags and/or leader lines to be repositioned.

This loop begins with start step 500 and then proceeds to step 510 which retrieves the next tag to be repositioned. The tags and/or leader lines to be repositioned were determined in step 370 and step 470 in FIGS. 7 and 8 as described above.

Then, the method attempts to find a nearest acceptable block of display grid coordinates for repositioning in step 520. As shown in FIG. 1, a tag 100 typically occupies more than one display grid coordinate. The nearest acceptable block for repositioning the tag is determined according to the following conditions:

(a) the block is large enough to contain a tag associated with the track;

(b) the block of displayed grid coordinates is unoccupied; and (c) the block of grid coordinates is positioned such that a leader line may be drawn from the icon to the tag without crossing through an occupied display grid coordinate.

Condition (a) varies according to the size of the tag 100. Furthermore, condition (b) utilizes the term "unoccupied", which may vary depending upon the desired features of the invention.

In one embodiment, the term "unoccupied" means unoccupied by other icons 150, leader lines 140 or tags 100. In an alternative embodiment, the term "unoccupied" means unoccupied by a runway in addition to unoccupied by a tag 100, leader line 140 or icon 150. In this way, tags 100 can be prevented from being displayed on a runway.

Further logic may be added to permit display of tag 100 on a runway only if the corresponding icon 150 is also located on the runway. In this way, tags 100 can be totally prevented from being displayed on any runway or may be allowed to be displayed on a runway if the corresponding icon 150 is also located on the runway. These features will help prevent obscuring important information on the display so that the air traffic controller can accurately assess the control situation confronting him.

Then, the method proceeds to decision block 530, which determines whether an acceptable block was found in step 520. If an acceptable block for repositioning the tag and leader line was found in step 520, then step 530 proceeds to step 560. If no acceptable block has been found, on the other hand, step 530 directs the method to step 540.

Step 540 then proceeds to find the nearest tag which has display grid coordinates which are closest to the tag to be repositioned. Then, step 550 indicates a time-share of the block of display grid coordinates occupied by the nearest tag identified in step 540.

Steps 540 and 550 effect a compromise wherein a crowded display does not permit an acceptable block of grid coordinates to be found for the tag to be repositioned. Because both tags contain important information, steps 540 and 550 compromise by displaying both tags on a time-share basis. In other words, the same block of display grid coordinates is used to display both tags on an alternate basis such that the first tag will be displayed for a first time interval and the second tag will be displayed for a second time interval. The first and second time intervals may be equal in a default mode or may be adjusted automatically according to priority of the track or adjusted by the air traffic controller according to his preferences.

When a block is time-shared, both of the tag's leader lines are drawn connecting the associated icons and the displayed tag. Furthermore, the leader line 140 for the currently displayed tag is highlighted to indicate which of the icons 150 are associated with the currently displayed tag. Further indications of a time-shared block can be utilized such as providing a different, unique color for the tag border.

After step 550, or if step 530 determines that an acceptable block of display grid coordinates has been found, the method proceeds to step 560.

Step 560 queues the tags and leader lines for display. In other words, the method first determines where each of the tags and leader lines should be displayed before actually displaying them. In this way, all conflicts will be resolved before driving the display. This technique helps prevent momentary displays of tags before their final positions have been determined. Such momentary displays may appear is as a flicker to the air traffic controller and would, thereby, degrade the picture presented to the air traffic controller.

Then, the step 570 tests whether all tags to be repositioned have been processed. If not, then step 570 directs the method back to step 510 to retrieve the next tag to be repositioned. On the other hand, if all tags have been processed, then step 570 directs the method to step 580.

Step 580 actually displays all the tags 100 and leader lines 140 according to the positions determined by the method described above. The method is then done as indicated by step 590.

The methods described above in FIGS. 7–9 will result in a tag 100 being displayed near its associated icon 150 with a leader line 140 drawn therebetween. If step 520 always finds a nearest acceptable block for repositioning the tag, then the tag will be maintained at a relatively fixed spacing with respect to the associated icon 150.

As an alternative, the invention also includes a feature of leader line stretching. Leader line stretching is a process which maintains a tag 100 at a fixed position while its corresponding icon moves. The leader line 140 is then stretched between the tag 100 and the repositioned icon 150. Leader line stretching continues until the icon 150 is located more than a predetermined distance away from its tag 100. Then, the tag 100 is repositioned near its corresponding icon 150.

Figure 10:
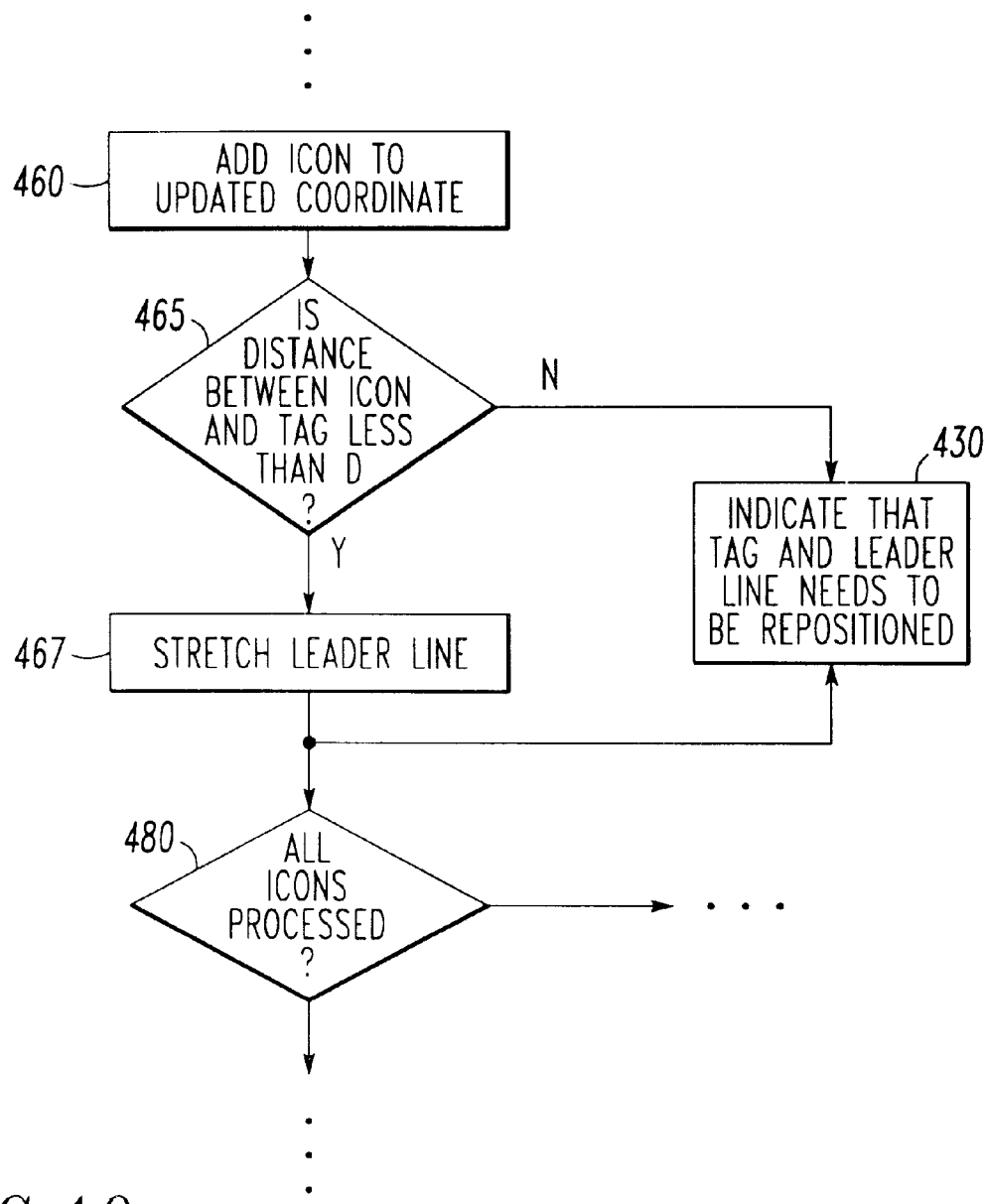
FIG. 10 is a high-level flow chart describing leader line stretching.

This general description of leader line stretching is more formally described in FIG. 10. FIG. 10 is a portion of a high-level flow chart which replaces steps 460, 470 and 480 in FIG. 8. The alternative flow shown in FIG. 10 begins with step 460 is which adds the icon to the updated display grid coordinate. Then, step 465 decides whether the distance between the icon 150 and its tag 100 is less than a predetermined distance value D. If yes, then decision step 465 proceeds to step 467, which stretches the leader line 140 between the repositioned icon 150 and the tag 100. In other words the tag 100 is maintained at a fixed position and the leader line 140 is stretched between the repositioned icon 150 and the fixed tag in step 467.

On the other hand, if step 465 determines that the distance between the icon 150 and the tag 100 is greater than the predetermined distance D, then the method proceeds to step 470. Step 470, as described in relation to FIG. 8, indicates that the tag 100 and leader line 140 needs to be repositioned. The tag and leader line repositioning is performed according to FIG. 9 as described above.

Then, the flow returns to the normal flow shown in FIG. 8 by executing step 480, which determines whether all icons have been processed as described above.

Organized Database Formation and Searching

As described above, the invention resolves conflicts between icons 150, leader lines 140, and tags 100. The invention may also resolve conflicts between these display elements and other displayed features, such as airport surface features that include runways and taxiways.

To efficiently resolve these conflicts, the invention preferably utilizes an organized data base. The organized data base encodes the relative positions and identities of the tags 100, leader lines 140, and icons 150. As an option, this organized data base may also encode the locations and identities of the runways and other airport surface features, so that, for example, the display manager will allow only tracks that are on a runway to have their tags 100 overlapping that runway.

The organized data base can be implemented with an X-Y tree as follows: The display screen is divided into rectangular grids defined by one complete 2-dimensional binary tree. The first dimension is a tree with a domain of Y and a range of X. The second dimension includes a number of trees, each of which has domain of X and a range containing the data elements that are being stored in the tree's database (e.g a pointer to the data representing the tag that resides at this (X,Y) location).

When an icon 150, leader line 140, or tag 100 occupies a display grid coordinate, this occupation is encoded into the binary trees. When a conflict between an icon, leader line or label occurs, or when the method must find the nearest acceptable block for repositioning as in step 520 above, the X- and Y-trees are searched for unoccupied areas. Preferably, this search pattern is a spiral search pattern that spirals out from the source location to find the nearest, unoccupied area for repositioning.

More particularly in regards to the X- and Y-trees, each branch of the binary tree has a pointer pointing towards a structure defining the content and priority thereof. A null pointer indicates that the corresponding display grid coordinate is unoccupied. If a pointer exists, then the area is occupied and the pointer points towards a structure defining its content and priority. Conflicts are negotiated according to this information. Newcomers, such as repositioned icons, may (1) claim already occupied areas and the former occupant is then put out for a search or, as described above, (2) continue the search for vacancy. Competing acquisitions may be moved or swapped according to the algorithms described above. Furthermore, an area may be partitioned and used for time-shared blocks, also as described above.

A particular example of building X-trees and a Y-tree is described below. This example encodes the icons 150, leader lines 140, and tags 100 shown in FIG. 2. In this encodation, the method employs one Y-tree and y X-trees as shown in FIGS. 11(a)–(f). In other words, FIG. 11(a) shows the Y-tree and FIGS. 11(b)–(f) show the X-trees that results from encoding FIG. 2.

For clarity, the runways and taxiways are not encoded in this example. For each row which includes a tag 100, leader line 140 or icon 150, the Y-tree has a corresponding node. For example, the root node of the Y-tree shown in FIG. 11(a) encodes the fact that row 25 includes an icon 150, leader line 140 or tag 100. This root node also has a pointer to the corresponding X-tree which is shown in FIG. 11(f). As shown in FIG. 11(f), the X-tree for row 25 indicates that an icon (I1) is located at column 48.

The structure of the binary tree also encodes the relative the locations of the elements therein. For example, the Y-tree shown in FIG. 11(a) branches left from the root node to the first level node, indicating that row 21 is to the left of row 25. Similarly, the Y-tree also indicates that row 22 is to the right of row 21 and that row 23 is to the right of row 22, etc. This positional encoding of rows and columns aids in the fast and efficient search for unoccupied display grid coordinates.

As mentioned above, the search for unoccupied display grid coordinates (step 520) and the search for nearest tags 200 (step 540) are preferably conducted with a spiral search pattern, which spirals out from the source location.

The type of element displayed is also encoded into the binary trees. For example, FIG. 11(f) indicates that icon I1 is located at column 48, while FIG. 11(d) indicates that leader line L1 is located at column 47. As mentioned above, the overlaid airport surface features may also be encoded into these binary trees, by, for example, placing a runway indicator R into the binary trees.

Figure 12:
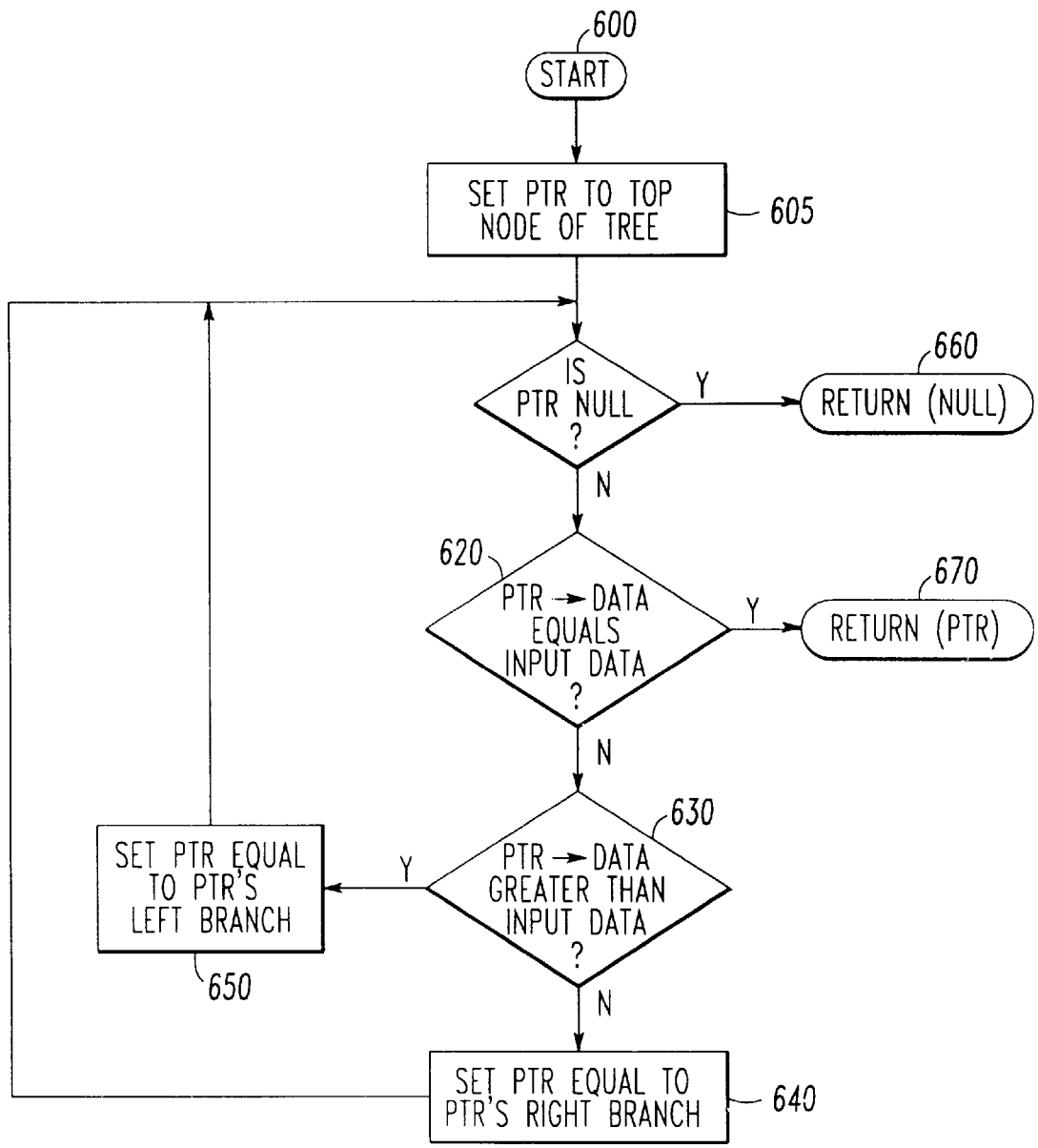
FIG. 12 is a high-level flow chart for traversing the binary trees used by the invention.

FIG. 12 more particularly describes the method of traversing a binary tree to find unoccupied display grid coordinates, find the nearest tag and to resolve conflicts. As shown in FIG. 12, the binary tree traversal method begins at step 600 and then proceeds to step 605, which sets the pointer to the top node of the tree. Then, the method tests whether this pointer is null in step 610. If the pointer is null, then the method proceeds to step 660, which returns a null indication, indicating that the corresponding display grid coordinate is unoccupied.

If, on the other hand, step 610 determines that the pointer is not null, then the method proceeds to step 620, which tests the pointer data against the input data. In other words, does the pointer point to data which equals the input data. If so, step 620 directs the method to return the pointer value in step 670. In this way, it can be determined whether input data (such as a tag to be repositioned) has already been encoded into the binary tree and where this data has been encoded in the binary tree (the pointer value).

If the pointer does not point towards data which equals the input data, then the method proceeds to step 630. Step 630 tests whether the pointed-to data is greater than the input data. If so, then step 620 directs the method to set the pointer equal to the pointer's left branch in step 650. This corresponds, for example, to proceeding from the root node in FIG. 11(a) to the first level node (the left branch of the root node).

On the other hand, if step 630 determines that the pointed-to data is not greater than the input data, then the method proceeds to step 640 which sets the pointer equal to the pointer's right branch. This corresponds, for example, to proceeding from the first level node in the FIG. 11(a) Y-tree to the second level node (the right branch of the first level node).

To even more particularly describe the method of applying binary trees to resolve conflicts, the following illustrative example is provided. Referring to FIG. 2, suppose that the position of aircraft 2 (T2) is updated from grid coordinate (40,20) to grid coordinate (41,21) This updated location for T2 conflicts with tag G1. Thus, a conflict has occurred and the tag G1 must be repositioned.

Stepping back a moment to the conflict-determining step, the binary tree shown in FIGS. 11(a–f) is utilized as follows. First, the Y-tree in FIG. 11(a) is accessed. Herein, the input data is (41,21). Step 605 sets the pointer to the top node of the Y-tree. Because the pointer is not null (step 610) and because the pointer does not equal the input data (step 620), the method proceeds to step 630. In step 630, it is determined that the pointer is greater than the input data whereupon step 650 is executed. Step 650 sets the pointer equal to the pointer's left branch (21).

Then, after 610 determines that this pointer is not null, step 620 positively indicates that the pointer now equals the input data which then returns the pointer value (21) in step 670.

The X-tree shown in FIG. 11(b) is then searched according to this pointer. Now, the pointer is set to the top node of the X-tree and the input data is now 41. In other words, when the pointer is advanced through the Y tree to the proper point, it is then pointing to the X tree for that Y coordinate. Similarly, when the pointer is advanced to the appropriate place in the X tree it will be pointing to the data that represents the tag G1 that resides at the coordinate (X=41, Y=21).

The binary tree traversal method quickly determines that the pointer equals the input data in step 620 and then returns the pointer value (41) in step 670. In this way, the method has positively determined that location (41,21) is already occupied by tag G1. Because a tag such as tag G1 has a lower priority than an icon, the icon T2 displaces tag G1 at location (41,21) and the X-trees are updated accordingly.

Now, tag G1 must be relocated. Utilizing the binary trees, a spiral search is conducted originating from (47,25) which is the location of the associated icon T1 to find the nearest unoccupied area for displaying tag G1.

This spiral search is not necessarily begun at the coordinate of the associated icon. First, it should be noted that the search follows any pattern that the user defines for the system. This means that the user defines a list of coordinates relative to the icon. When looking to place a tag in a new location (either because the tag is being drawn for the first time or because it is being repositioned), the search is done using the list of relative coordinates previously defined by the user, the search is done using the list of relative coordinates previously defined by the user. Because it is advantageous to limit the movement of the tag relative to the icon (to ease the task of the air traffic controller), a list of relative coordinates is created that describes, for example, a spiral centered on the icon. It is an expanding spiral because one would ideally like to place the tag as close to the icon as possible.

When a tag is being drawn for the first time the search algorithm begins at the top of the list of coordinates and works its way down the list, stopping when a position that can accommodate the tag is found. (e.g. Starting at a coordinate close to the icon and spiraling outward.)

However, if the tag is being redrawn at a new location a different start point for the search is used. If the tag is being repositioned because, for example, its associated icon has moved and its leader line has reached its maximum allowable length, the algorithm begins the search at the same place in the list that was used to previously draw the tag. This means that the tag will move a minimum amount relative to the icon (perhaps almost not at all if the initial placement attempt is successful).

If, however, the tag is being repositioned because of having been displaced by another, higher priority, datum, the search algorithm will start at the next position in the list, i.e. at the list item following the one that was used to draw the tag at its most recent position.

By following these rules (and by selecting an appropriate list of relative positions such as the is spiral list) the tag's movement relative to the icon is minimized. (It should be noted that, if the end of the list is reached, the search continues from the top of the list until either 1) the tag is placed or 2) every entry in the list has been exercised once).

As a point of information to aid in understanding of this process it should be pointed out that, although the above explanation uses a Y tree with subordinate X trees, an implementation that uses X trees with subordinate Y trees would accomplish the same purpose with the same efficiency. There is no practical difference between the two methods.

The organized database can also be implemented with a two-dimensional array to which the display information can be mapped. The X,Y locations of the icon 150, leader line 140, and tag 100 can be uniquely mapped to a two-dimensional array having a corresponding set of array locations to access data stored therein and manage the display.

Alternative Applications of Display Managing Method and System

Although the display managing method described above finds particular application in the air traffic control environment, it is not limited thereto. Any environment having icons 150, tags 100 and leader lines 140 which must be displayed would be highly improved by applying the display managing method described herein.

For example, the invention may be used with a computer game in which virtual objects are created by a computer, and icons 150 are used to represent such virtual objects on a display. The tags 100 associated with the icons 150 may then be used to display information regarding the virtual object.

Furthermore, the invention may be applied to a fleet dispatch system for dispatching a fleet of units to various destinations wherein the display management system and method manages the display to the fleet dispatcher. The fleet of units may be a fleet of vehicles such as cabs, trucks, police cars, or emergency equipment (ambulances, fire trucks, hazardous waste emergency equipment, etc.) or may be a fleet of military units such as an army.

Fleet dispatch is a common problem which faces many industries such as taxicabs, emergency dispatch, trucking and the military. In each of these illustrative types of fleet dispatch, a human dispatcher must keep track of the location, type and status of each unit in the fleet to accurately and efficiently dispatch the fleet. This invention greatly improves the ability of the human dispatcher to complete this task.

Figure 13:
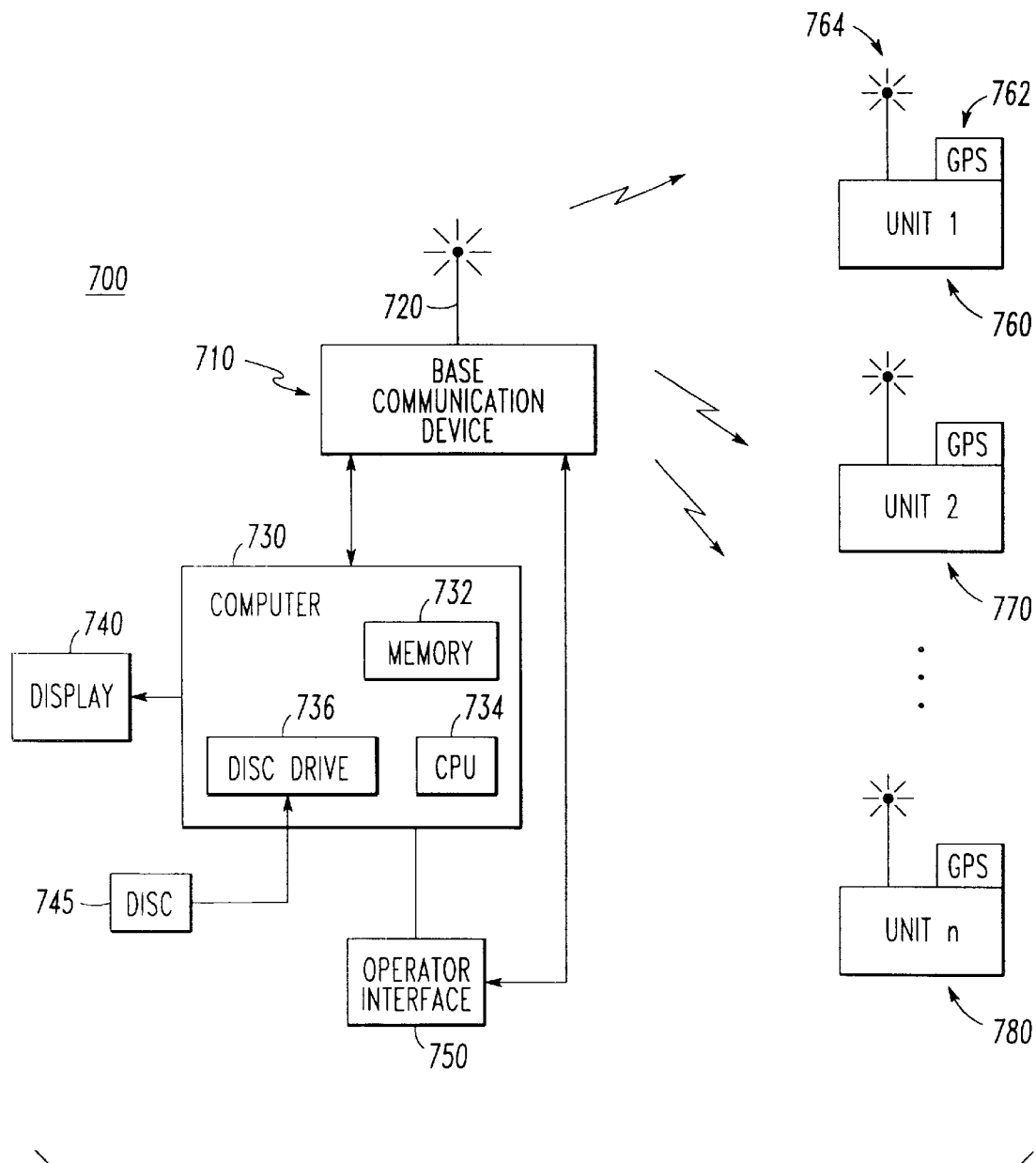
FIG. 13 is a fleet dispatch system which utilizes the display managing method of the invention.

A fleet dispatch system 700, as generally shown in FIG. 13, includes a base communication device 710 having an antenna 720. A computer 730 is connected to the base communication device 710. The computer 730 includes a memory device 732, central processing unit (CPU) 734, and disk drive 736. The computer 730 may be specially configured with hardware elements to implement the invention.

Furthermore, a disc 740 such as a magnetic or optical recording medium may be inserted into disc drive 736. The disc 740 may include an embodiment of the invention in software form which can be used to transform the general purpose computer 730 into a special purpose machine for conducting fleet dispatch utilizing the display managing methods of the invention.

Furthermore, a display 745 is connected to the computer 730 for outputting the displays generated by the invention. The display 745 may be a single unit or multiple units for multiple operators, as needed.

Still further, the fleet includes a plurality of units 760, 770, and 780. Each unit (760, 770, 780) includes a mobile communication system 764 and a position-determining device 762. The positioning-determining device 762 may be, for example, based on global-positioning satellite (GPS) protocol or other position-determining protocols.

The base communication device 710 communicates with each of the units (760,770,780) via antenna 720 and mobile communication system 764 within each of the units (760, 770,780). This communication is indicated as a wireless communication in FIG. 13, but it is to be understood that any type of communication may be employed. For example, if the units are robots within a factory, then a hardwired or infrared communication protocol may be utilized.

To enable an operator to interact with the fleet dispatch system 700, an operator interface 750 is provided which may be connected both to the computer 730 and the base communication device 710. The operator interface will typically include a speaker, microphone, keyboard, mouse etc (not shown). The speaker and microphone may be used for voice communication with each of the units 760,770, and 780.

Furthermore, the unite (760,770,780) are generalized units which may be taxicabs, military units, robots, trucks, etc. In this way, the dispatcher can accurately track each of the units within the fleet to efficiently dispatch the units to desired locations and assignments.

Alternative Tags

As shown in FIGS. 14(*a*)–(*c*), the invention is not limited to the tags 100 shown in FIGS. 1–2.

The preferred tag were for air traffic control display management system managing ground traffic at an airport is shown in FIG. 14(*a*). FIG. 14(*a*) contains the basic elements of a tag 100 including a tag border 110, tag background 120 and information 130. Also shown in FIG. 14(a) is a leader line 140 and an icon 150 representing an aircraft.

The tag 100 in FIG. 14(a) also includes an airline indication field 132, a flight number field 134, an aircraft type field 136 and a light/heavy aircraft field 138. The example shown in FIG. 14(a) indicates American Airlines flight 542, which is a Boeing 737 aircraft of the light variety.

If the invention were applied to monitor and manage the display of airspaces, then the aircraft type field 136 and aircraft light/heavy field 138 may be substituted with an altitude information field to display the altitude of the aircraft. Of course, other information, or combinations of information, may be displayed in information field 130 of tag 100.

FIG. 14(b) shows an example of a tag 100, leader line 140 and icon 150 which may be utilized in a taxi dispatch system 700. As shown in FIG. 14(b), the tag 100 includes various information fields within information area 130. These information fields include an area for the cab identification (cab no. 1), and occupied indication field (OCC/UN), a field indicating the cab driver (Joe Smith), a field indicating the type of vehicle (van), a field indicating whether the cab is handicap accessible (indicated by an appropriate symbol), and/or a field indicating the estimated time of arrival (ETA).

In general, the information displayed in information area 130 should enable the dispatcher to efficiently manage his fleet. Furthermore, the icon 150 may be customized to graphically indicate the type of vehicle and/or whether it is handicapped accessible. Furthermore, a color code may be utilized to graphically indicate, for example, that some cabs are occupied (eg. green), while some cabs are available (eg. red).

Another example of a tag 100 is shown in FIG. 14(c). The FIG. 14(c) tag is an example of a tag which may be used in a military command and control (fleet dispatch) system 700 generally described in FIG. 13. In this tag 100, the information area 130 encodes information useful to the military commander, such as tank type (Abrams tank), tank I.D. number (B11), tank commander (Colonel Rommel), damage to tank, range left until refueling, and/or communication frequency.

Of course, the information included in information field 130 may vary depending upon the rank of the military commander, military situation involved and other factors. Still further, a color code may be used to graphically depict the status of the tanks, such as showing damaged tanks in red and tanks low on fuel in orange. Also, tanks assigned to a common division or subdivision may be color coded or indicated with similar graphical icons 150. As further shown in FIG. 14(c), the icon 150 may also indicate the type of military unit.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An air traffic control display management system, comprising:

a radar device emitting radar and receiving radar returns identifying positions of objects including positions of aircraft;

a receiver receiving transponder signals from the aircraft, the transponder signal including aircraft identification information;

an icon display driver displaying icons each of which represents a corresponding object at the display grid coordinate determined by a display grid coordinate calculator;

a tag display driver displaying a tag near each of the icons wherein the tag includes the object information associated with the corresponding icon;

a leader line displaying device displaying a leader line substantially connecting each of the corresponding tags and icons;

said radar device updating the position information;

an icon repositioner repositioning the icon on the display at an updated display grid coordinate corresponding to the updated position information;

a conflict determiner determining if a tag conflicts with the repositioned icon;

a conflicting tag relocator relocating a conflicting tag, wherein the conflicting tag is located at a display grid coordinate which conflicts with the repositioned icon.

2. The air traffic control display management system according to claim 1, said conflict determiner further determining if a leader line conflicts with the repositioned icon;

said relocator relocating the conflicting leader line, wherein the conflicting leader line is located at a display grid coordinate which conflicts with the repositioned icon, the system further comprising:

a tag and leader line repositioner repositioning the tag and leader line associated with the repositioned icon.

3. The air traffic control display management system according to claim 2, further comprising:

a conflict determiner determining if the repositioned tag or leader line conflicts with an icon, tag or leader line; and a conflicting tag or leader line mover-moving at least one of the conflicting tag or leader line to unoccupied display grid coordinates.

4. The air traffic control display management system according to claim 3, further comprising:

a prioritizer prioritizing the conflicting tags, leader lines anci icons, said conflicting tag or leader line mover moving at lease one of the conflicting tag or leader line to display grid coordinates according to the priority determined by said prioritizer.

5. The air traffic control display management system according to claim 2, further comprising:

a tag time-sharing device time-sharing a tag location between two conflicting tags if there are no unoccupied display grid coordinates for independently displaying both of the conflicting tags within respective, predetermined radii centering on the associated icons.

6. The air traffic control display management system according to claim 2, further comprising:

a tag position maintainer maintaining a tag position on the display grid coordinates when the associated icon has been repositioned;

a leader line stretcher stretching the leader line associated with the repositioned icon until the leader line is a predetermined length;

a tag and leader line mover moving the tag closer to the associated, repositioned icon and a leader line redrawer redrawing the leader line associated with the repositioned icon when said leader line stretcher determines that the leader line has reached the predetermined length.

7. The air traffic control display management system according to claim 2, further comprising:

an encoder encoding the tracking information into a plurality of X- and Y-trees.

8. The air traffic control display management system according to claim 7, said tag and leader line repositioner searching the X and Y-trees to find unoccupied display grid coordinates using a spiral search pattern centering on the icon associated with the repositioned icon.

9. The air traffic control display management system according to claim 1, further comprising:
   an encoder encoding the tracking information into a plurality of X- and Y-trees.

10. The air traffic control display management system according to claim 9, said conflicting tag or leader line relocator searching the X an d Y-trees to find unoccupied display grid coordinates using a spiral search pattern centering on the icon associated with the conflicting tag or leader line.

11. The air traffic control display management system according to claim 1, further comprising:
   an overlay display driver overlaying airport surface features on the display including a runway and a taxiway;
   said tag display driver prohibiting a tag to be displayed on the runway unless the associated icon is located on the runway.

12. The air traffic control display management system according to claim 1,
   said receiver receiving transponder signals from the aircraft, the transponder signal including aircraft altitude information;
   a memory storing the aircraft altitude information from said receiver;
   said tag display driver displaying the tag near each of the icons wherein the tag includes the aircraft altitude information associated with the corresponding icon.

13. The air traffic control display management system according to claim 1, wherein the tags include a foreground, a background, and a border, the system further comprising:
   a color assigner assigning colors to the tag foreground, tag background, and tag border,
   wherein a combination of foreground, background and border colors uniquely corresponds to a track state.

14. The air traffic control display management system according to claim 13,
   wherein the track states include departing, departure-aborting, landing, taxiing, arriving, stopping, climbing, descending, cruising, coasting, cautioning and warning track states,
   wherein the unique combination of colors for each track state is substantially as follows:

| Track State | Foreground | Background | Border | Line | Icon |
| --- | --- | --- | --- | --- | --- |
| Depart | black | cyan | blue | blue | white |
| Depart Abort | white | red | green | green | white |
| Landing | green | blue | green | green | white |
| Taxi | black | green | green | green | white |
| Arrival | black | cyan | green | green | white |
| Stop | green | black | black | green | white |
| Climbing | cyan | blue | cyan | cyan | white |
| Diving | green | blue | Green | green | white |
| Cruising | cyan | black | black | cyan | white |
| Coasting | white | magenta | light blue | light blue | white |
| Caution | black | yellow | yellow | yellow | white |
| Warning | white | red | red | red | white |

15. A computer implemented method of managing icons, tags and leader lines on a display, comprising the steps of:
   inputting tracking information including position information and associated object information of a plurality of objects,
   displaying icons each of which represents a corresponding object at display grid coordinates corresponding to the position information;
   displaying a tag near each of the icons wherein the tag includes the object information associated with the corresponding icon;
   displaying a leader line substantially connecting each of the corresponding tags and icons;
   updating the position information;
   repositioning the icon on the display at an updated display grid coordinate corresponding to the updated position information;
   determining if a tag conflicts with the repositioned icon; and
   relocating the conflicting tag,
   wherein the conflicting tag is located at a display grid coordinate which conflicts with the repositioned icon.

16. The computer implemented method of managing icons, tags and leader lines on a display according to claim 15,
   said determining step further determining if a leader line conflicts with the repositioned icon;
   said relocating step relocating the conflicting leader line, wherein the conflicting leader line is located at a display grid coordinate which conflicts with the repositioned icon, the method further comprising the step of:
   repositioning the tag and leader line associated with the repositioned icon.

17. The computer implemented method of managing icons, tags and leader lines on a display according to claim 16, further comprising the step of:
   determining if the repositioned tag or leader line conflicts with an icon, tag or leader line; and
   moving at least one of the conflicting tag or leader line to unoccupied display grid coordinates.

18. The computer implemented method of managing icons, tags and leader lines on a display according to claim 17, further comprising the step of:
   prioritizing the conflicting tag, leader line and icon,
   said at least one of the moving the conflicting tag or leader line step moving the conflicting tag or leader line to display grid coordinates according to the priority determined in said prioritizing step.

19. The computer implemented method of managing icons, tags and leader lines on a display according to claim 16, further comprising the step of:
   time-sharing a tag location between two conflicting tags if there are no unoccupied display grid coordinates for independently displaying both of the conflicting tags within respective, predetermined radii centering on the associated icons.

20. The computer implemented method of managing icons, tags and leader lines on a display according to claim 16, further comprising the steps of:
   maintaining a tag position on the display grid coordinates when the associated icon has been repositioned;
   stretching the leader line associated with the repositioned icon until the leader line is a predetermined length;
   moving the tag closer to the associated, repositioned icon and redrawing the leader line associated with the repositioned icon when said leader line stretching step determines that the leader line has reached the predetermined length.

21. The computer implemented method of managing icons, tags and leader lines on a display according to claim 16, further comprising the steps of:

encoding the tracking information into a plurality of X- and Y-trees.

22. The computer implemented method of managing icons, tags and leader lines on a display according to claim 21, said repositioning the tag and leader line step including the substep of searching the X and Y-trees to find unoccupied display grid coordinates using a spiral search pattern centering on the icon associated with the repositioned icon.

23. The computer implemented method of managing icons, tags and leader lines on a display according to claim 15, wherein the object information includes identification information identifying the object and the tag displays the identification information.

24. The computer implemented method of managing icons, tags and leader lines on a display according to claim 15, further comprising the steps of:

encoding the tracking information into a plurality of X- and Y-trees.

25. The computer implemented method of managing icons, tags and leader lines on a display according to claim 24, said relocating a conflicting tag or leader line step including the substep of searching the X and Y-trees to find unoccupied display grid coordinates using a spiral search pattern centering on the icon associated with the conflicting tag or leader line.

26. The computer implemented method of managing icons, tags and leader lines on a display according to claim 15, wherein the tags include a foreground, a background, and a border, the method further comprising the step of:

assigning colors to the tag foreground, tag background, and tag border, wherein a combination of foreground, background and border colors conveys information regarding the associated object.

27. The computer implemented method of managing icons, tags and leader lines on a display according to claim 15, wherein the objects are virtual objects created by the computer and the icons represent the virtual objects on the display.

28. The computer implemented method of managing icons, tags and leader lines on a display according to claim 15, wherein the objects are aircraft, the icons represent the aircraft on the display, the tracking information includes identification information that identifies each aircraft, and the tag displays the identification information.

29. The computer implemented method of managing icons, tags and leader lines on a display according to claim 28, further comprising the step of:

overlaying airport surface features on the display including a runway and a taxiway;

said tag displaying step prohibiting a tag to be displayed on the runway unless the associated icon is a located on the runway.

30. The computer implemented method of managing icons, tags and leader lines on a display according to claim 1 being utilized in a fleet dispatch system for dispatching a fleet of units to various destinations, wherein the plurality of objects is the fleet of units, the fleet dispatch system comprising:

a communication device located in each of the units;

a position determining device located in each of the units;

a base communication device located at a base station, said base communication device communicating data, including unit position data and dispatch data, with the fleet of units via said communication device;

a display located at the base station displaying the icons, tags and leader lines for each of the units;

a computer programmed with the computer implemented method of managing icons, tags and leader lines on the display according to claim 1, wherein the icons represent the units, the tracking information includes identification information identifying each unit and the tags display the identification information.

31. The computer implemented method according to claim 30, wherein the fleet is a fleet of vehicles, wherein the icons represent the vehicles, the tracking information includes identification information identifying each vehicle and the tags display the identification information.

32. The computer implemented method according to claim 30, wherein the fleet is a fleet of military units, the icons represent the military units, the tracking information includes identification information identifying each military unit and the tags include the identification information.

33. An article of manufacture, comprising:

a computer-usable medium including computer-readable program code means, embodied therein, for causing a computer to manage icons, tags and leader lines on a display, the computer-readable program code means comprising:

computer-readable program code means for inputting tracking information including position information and associated object information of a plurality of objects;

computer-readable program code means for storing the tracking information;

computer-readable program code means for displaying icons each of which represents a corresponding object at display grid coordinates corresponding to the position information;

computer-readable program code means for displaying a tag near each of the icons wherein the tag includes the object information associated with the corresponding icon;

computer-readable program code means for displaying a leader line substantially connecting each of the corresponding tags and icons;

computer-readable program code means for updating the position information;

computer-readable program code means for repositioning the icon on the display at an updated display grid coordinate corresponding to the updated position information;

computer-readable program code means for determining if a tag conflicts with the repositioned icon; and computer-readable program code means for relocating the conflicting tag, wherein the conflicting tag is located at a display grid coordinate which conflicts with the repositioned icon.

34. The article of manufacture according to claim 33, said computer program code means for determining further determining if a leader line conflicts with the repositioned icon;

said computer program code means for relocating relocating the conflicting leader line, wherein the conflicting leader line is located at a display grid coordinate which conflicts with the positioned icon, further comprising:

computer-readable program code means for repositioning the tag and leader line associated with the repositioned icon.

35. The article of manufacture according to claim 34, further comprising:

computer-readable program code means for determining if the repositioned tag or leader line conflicts with an icon, tag or leader line; and computer-readable program code means for moving at least one of the conflicting tag or leader line to unoccupied display grid coordinates.

36. The article of manufacture according to claim 35, further comprising:

computer-readable program code means for prioritizing the conflicting tag, leader line and icon, said computer-readable program code means for moving at least one of the conflicting tag or leader line moving at least one of the conflicting tag or leader line to display grid coordinates according to the priority determined in said prioritizing step.

37. The article of manufacture according to claim 34, further comprising:

computer-readable program code means for time-sharing a tag location between two conflicting tags if there are no unoccupied display grid coordinates for independently displaying both of the conflicting tags within respective, predetermined radii centering on the associated icons.

38. The article of manufacture according to claim 34, further comprising:

computer-readable program code means for maintaining a tag position on the display grid coordinates when the associated icon has been repositioned;

computer-readable program code means for stretching the leader line associated with the repositioned icon until the leader line is a predetermined length;

computer-readable program code means for moving the tag closer to the associated, repositioned icon and redrawing the leader line associated with the repositioned icon when said computer-readable program code means for leader line stretching determines that the leader line has reached the predetermined length.

39. The article of manufacture according to claim 34, further comprising:

computer-readable program code means for encoding the tracking information into a plurality of X- and Y-trees.

40. The article of manufacture according to claim 39, said computer-readable program code means for repositioning the tag and leader line including computer-readable subprogram code means for searching the X and Y-trees to find unoccupied display grid coordinates using a spiral search pattern centering on the icon associated with the repositioned icon.

41. The article of manufacture according to claim 33, wherein the object information includes identification information identifying the object and the tag displays the identification information.

42. The article of manufacture according to claim 33, further comprising:

computer-readable program code means for encoding the tracking information into a plurality of X- and Y-trees.

43. The article of manufacture according to claim 42, said computer-readable program code means for relocating a conflicting tag or leader lead step including computer-readable subprogram code means for searching the X and Y-trees to find unoccupied display grid coordinates using a spiral search pattern centering on the icon associated with the conflicting tag or leader line.

44. The article of manufacture according to claim 33, wherein the tags include a foreground, a background, and a border, the article of manufacture further comprising:

computer-readable program code means for assigning colors to the tag foreground, tag background, and tag border, wherein a combination of foreground, background and border colors conveys information regarding the associated object.

45. The article of manufacture according to claim 33, wherein the objects are virtual objects created by the computer and the icons represent the virtual objects on the display.

46. The article of manufacture according to claim 33, wherein the objects are aircraft, the icons represent the aircraft on the display, the tracking information includes identification information that identifies each aircraft, and the tag displays the identification information.

47. The article of manufacture according to claim 46, further comprising:

computer-readable program code means for overlaying airport surface features on the display including a runway and a taxiway;

said computer-readable program code means for tag displaying prohibiting a tag to be displayed on the runway unless the associated icon is located on the runway.

* * * * *